United States Patent [19]
Heller

[11] Patent Number: 5,790,573
[45] Date of Patent: Aug. 4, 1998

[54] HIGH POWER FREE ELECTRON LASING DEVICE USING ELECTROSTATIC WIGGLERS WITH RECIRCULATING BEAMS BETWEEN A PAIR OF MAGNETIC MIRRORS

[76] Inventor: Robert Heller, 1111 Loxford Ter., Silver Spring, Md. 20901

[21] Appl. No.: 680,967

[22] Filed: Jul. 16, 1996

[51] Int. Cl.⁶ .................................................. H01S 3/00
[52] U.S. Cl. ........................... 372/2; 372/37; 372/74; 372/99
[58] Field of Search .................... 372/2, 37, 28, 372/74, 73, 99

[56] References Cited

U.S. PATENT DOCUMENTS

| | | | |
|---|---|---|---|
| 4,331,936 | 5/1982 | Schlesinger et al. | 372/37 |
| 4,466,101 | 8/1984 | Schoen | 372/2 |
| 5,095,486 | 3/1992 | Etievant | 372/37 |
| 5,190,911 | 3/1993 | Takemura | 372/2 |
| 5,263,035 | 11/1993 | Leboutet et al. | 372/37 |
| 5,280,490 | 1/1994 | Conde et al. | 372/37 |
| 5,375,130 | 12/1994 | Shih | 372/2 |
| 5,408,479 | 4/1995 | Heller | 372/37 |
| 5,410,558 | 4/1995 | Hackett | 372/37 |

*Primary Examiner*—Leon Scott, Jr.
*Attorney, Agent, or Firm*—Pollock, Vande Sande & Priddy

[57] ABSTRACT

An apparatus for producing high intensity laser radiation. A vacuum enclosure is provided which includes first and second magnets at each end, and a magnetic field applied along the length of the enclosure. The magnets and applied magnetic field forms a magnetic mirror for electrons of a near relativistic energies introduced into the vacuum enclosure. A thin dielectric material is provides which is charged on each side by some of the electrons which strike the surfaces of the dielectric. The charged dielectric provides high intensity electrostatic fields at the edges thereof. The strength of the magnets and applied magnetic field are selected to produce an oscillation of electrons which pass through the high intensity electrostatic fields and are subject to a radial acceleration which produces free electron lasing. The laser energy is collected by an optical cavity within the enclosure. The laser energy exits an optical port within the enclosure.

14 Claims, 3 Drawing Sheets

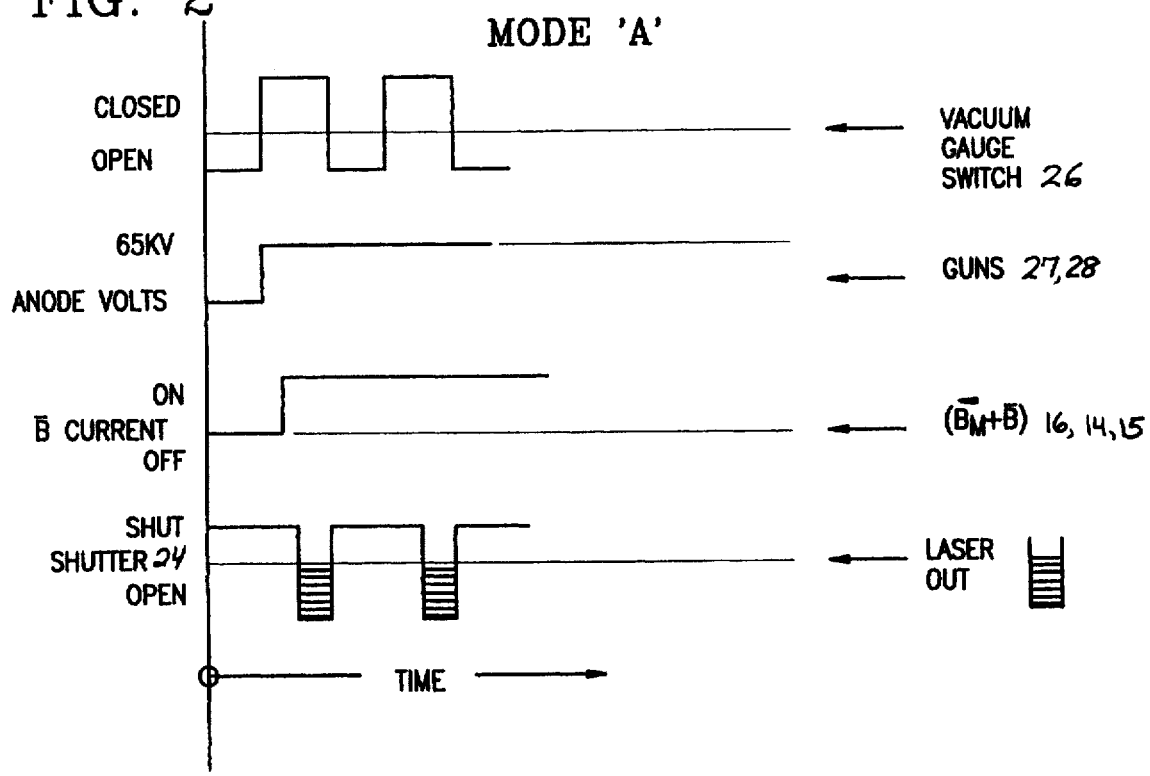
FIG. 2  MODE 'A'
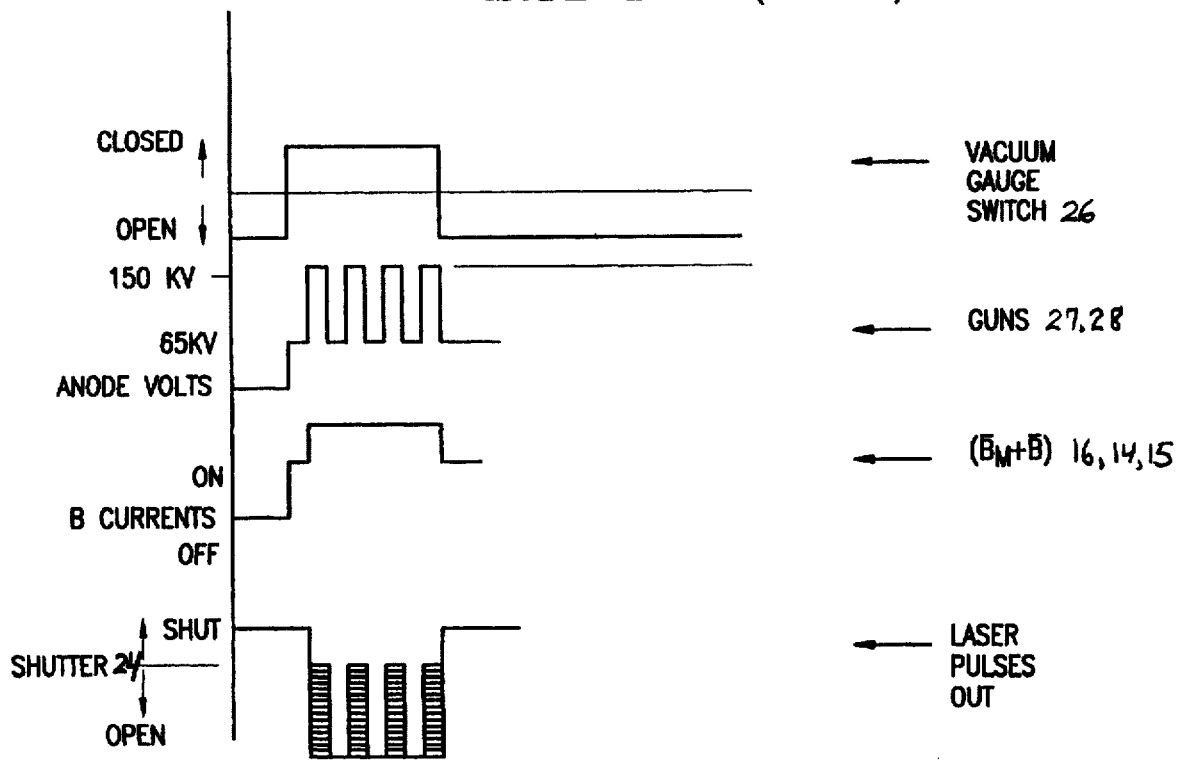
FIG. 3  MODE 'B'  (ONE FIRING)

HIGH POWER FREE ELECTRON LASING DEVICE USING ELECTROSTATIC WIGGLERS WITH RECIRCULATING BEAMS BETWEEN A PAIR OF MAGNETIC MIRRORS

FIELD OF THE INVENTION

The present invention relates to the generation of high intensity laser energy. Specifically, an apparatus is provided for producing free electron lasing from near relativistic beams confined within a pair of magnetic mirrors.

BACKGROUND OF THE INVENTION

Previous U.S. Pat. No. 5,408,479 describes a technique for creating free electron lasing using an electrostatic field for radially accelerating electrons at near relativistic velocities. The foregoing patent illustrates with respect to several embodiments an electrostatic acceleration technique for generating very high intensity electrostatic fields capable of radially accelerating (or wiggling) a free electron to produce free electron lasing. The high electrostatic fields are created by a thin dielectric material which is charged on both sides by charges of a like polarity to produce at its edges a high intensity electrostatic field. A free electron of a near relativistic electron beam entering the region of the edges of the dielectric is radially accelerated producing lasing optical energy which may be directed through an optical port in the device.

The present invention is a continuation of this effort for creating high intensity laser energy by use of the thin dielectric static wiggler, which induces a radial acceleration to free electrons passing by the edge thereof. Further, specific measures are taken to provide a window which will release the laser energy from the device with minimum attenuation. Various improvements are made to the original electrostatic device for creating a self sustained average effective electrostatic energy density for creating the free lasing.

SUMMARY OF THE INVENTION

The present invention includes an apparatus which produces high intensity pulses of laser energy. The device includes a vacuum chamber supporting a pair of magnetic mirrors for oscillating or recirculating free electrons between first and second ends of the vacuum chamber. A thin dielectric material is supported within the magnetic mirror chamber which is charged on each side thereof to produce a high intensity electric field. Electrons which oscillate between the first and second ends of the vacuum chamber having the magnetic mirrors in the vicinity of the edges of the dielectric material are radially accelerated producing high intensity optical energy. A low loss optical window is provided within the vacuum chamber for permitting high intensity laser energy produced by the radial acceleration of the free electrons to escape from the device.

In a preferred embodiment of the invention, the optical window comprises an opening in the vacuum chamber which communicates with a vacuum chamber. The vacuum chamber in turn includes at an opposite end thereof a shutter which can be preset to operate to open and close, permitting laser radiation to be coupled from the device through the opening without significant attenuation.

BRIEF DESCRIPTION OF THE DRAWINGS

FIG. 2 is an illustration of a timing diagram for producing pulse laser radiation from the device of FIG. 1.

FIG. 3 is yet another timing diagram for producing high intensity pulsed laser radiation from the device of FIG. 1.

DESCRIPTION OF THE PREFERRED EMBODIMENT

Figure 1:
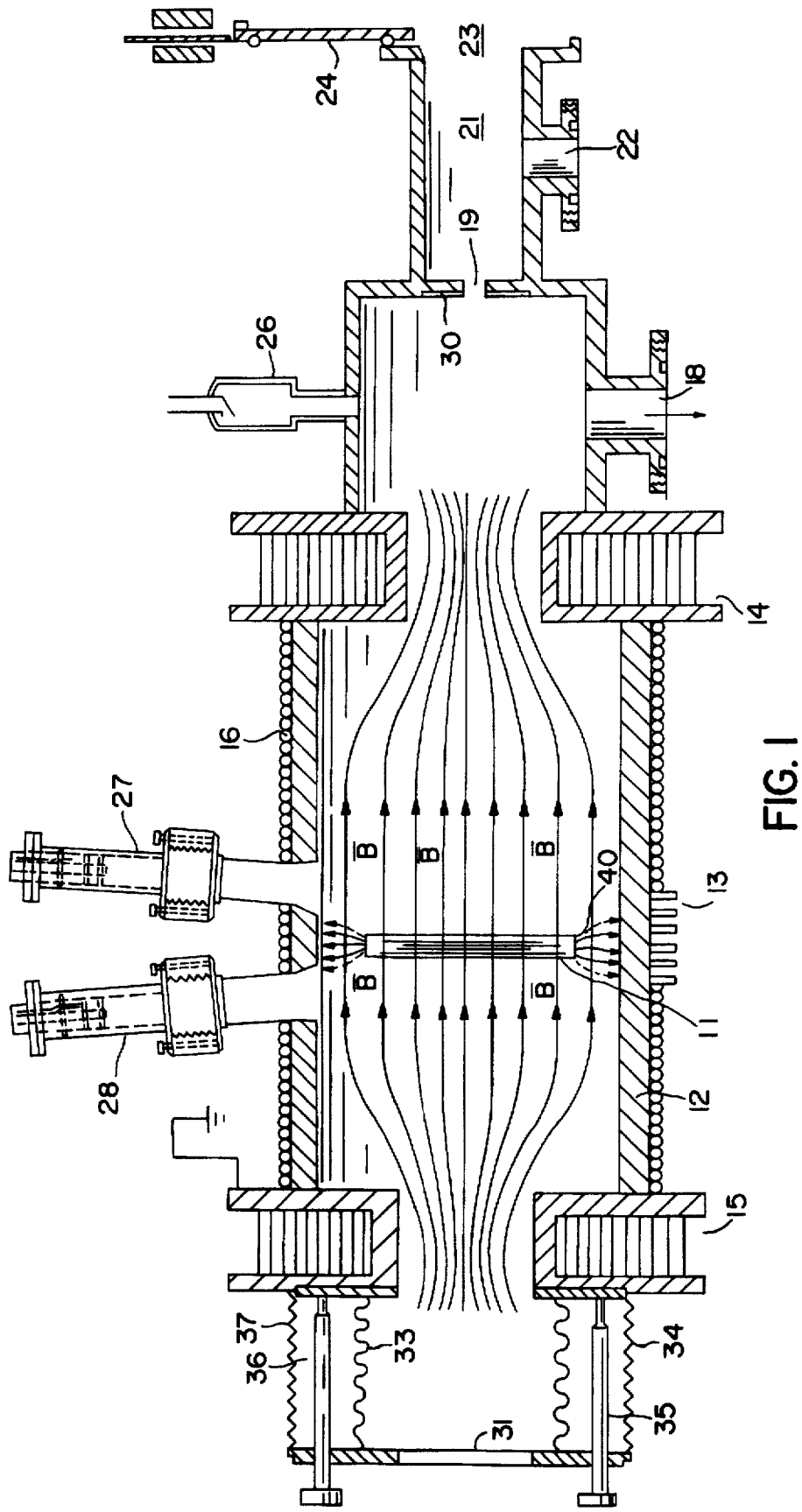
FIG. 1 is a section view of a first embodiment of the invention for producing high intensity laser radiation.

FIG. 1 illustrates a pair of magnetic mirrors and a thin dielectric material 11 supported perpendicular to the narrow dimension of the vacuum enclosure 12. The magnetic mirrors includes first and second magnets 14 and 15 disposed at each end of the magnetic mirror. The magnets are preferably super conducting, high temperature magnets which can create magnetic fields $\overline{B}_m$ at each end of the mirror. Along the length of the mirror is a third electromagnetic element 16 which creates a third magnetic field, $\overline{B}$, of lower intensity along the length of the vacuum enclosure 12. A vacuum is drawn through port 18 to establish a vacuum within enclosure 12. A second port 19 permits laser radiation to be coupled from the vacuum chamber 12 to a fast vacuum differential chamber 21 which can couple to rarefied atmosphere for airborne and space applications. Cooling fins 13 will reduce the temperature of the chamber 12.

As laser intensities increase, it becomes difficult to find a material to provide the optical window which will withstand the high intensity radiation and have a low attenuation. The vacuum differential chamber 21 permits the laser energy to be withdrawn from the vacuum chamber 12 with little attenuation while still permitting a vacuum to be maintained within vacuum chamber 12. The for intended usage vacuum differential chamber is connected via port 22 to its own vacuum pump, for maintaining a vacuum within the vacuum differential chamber 21. A remaining open end of the vacuum differential chamber is closed by a shutter 24 which is supported for sliding movement to open and close vacuum port 23. When the shutter 24 is in the closed position, the vacuum differential chamber 21 and chamber 12 are sealed against atmospheric leakage. A vacuum gauge switch 26 is used to control a vacuum pump connected to port 18 for maintaining the desired pressure within vacuum chamber 12.

Two electron guns 27 and 28 provide near relativistic electron beams 65–150 kv each oriented at an angle to the magnetic field $\overline{B}$ produced by magnet 16. The relativistic beams charge each side of the dielectric material 11 with the same polarity charge as set forth in the aforesaid U.S. Pat. No. 5,408,479. The thin dielectric material 11 produces about the edges thereof a high intensity electrostatic field 40.

The kinetic energy of the electron beams produced by electron guns 27 and 28 is selected so that electrons which enter the magnetic region are magnetically contained, then reflected, towards and away from each magnetic field of the magnet elements 14 and 15 constituting the pair of magnetic mirrors. Further, the deflected electrons which are incident to one or the other side of the dielectric 11 should have sufficient energy distribution so that they lodge on or extend slightly below the surface of the dielectric.

Electrons which enter the vacuum chamber 12 experience a combined longitudinal and helical motion in the magnetic region $\overline{B}$. While some will lodge on the surface of the dielectric material 11, others migrate towards the ends of the vacuum chamber 12. Due to the magnetic mirroring provided by the magnet elements 14 and 15, the migrating electrons reverse direction in the area of the magnet elements 14 and 15. Mirror reflection which is known in the art is accomplished by varying the electron gun velocity and the magnetic intensity $\bar{B}_m$ and $\bar{B}$, until the following criteria $$\left| \frac{v_\parallel}{v_\perp} \right| < \left( \frac{\bar{B}_m}{\bar{B}} - 1 \right)^{\frac{1}{2}}$$

is reached, where $v_\parallel$ is the beam velocity parallel to the long dimension of the chamber 12 and $v_\perp$ the electron velocity perpendicular to the long dimension.

Magnetic mirroring results in the helically and longitudinally moving electrons changing direction, and heading towards the dielectric material 11, forcing some of the electrons into the high intensity electrostatic field around the edges of the dielectric material 11. The electrostatic field imparts a radial acceleration to the electrons generating a spectrum of laser energy.

At each end of the vacuum chamber 12 are elements 30 and 31 which constitute an optical resonant cavity. The optical element 30 includes an opening coincident with the port 19 of the vacuum chamber permitting optical energy trapped between optical element 30 and 31 to exit the vacuum chamber 12. The optical cavity is tunable by virtue of the bellows 33 supporting mirror 31. Multiple tuning screws, two of which 35 and 36, are shown, position mirror 31 against the force from springs 34 and 37. Thus, it is possible to provide some optical spectrum selectivity of the produced laser radiation.

The radial cross-section distribution of electrons near the dielectric material 11 can be analyzed in three categories. The first includes a portion that misses the dielectric near its edge, and which is subject to the intense electrostatic field, resulting in free electron lasing. A second portion of the beam includes electrons with sufficient energy to penetrate the thin dielectric material 11, and a third non-penetrating portion of the beam includes electrons which reside on and slightly below the dielectric surface. The volume distribution from the non-penetrating portion of the beam charges the dielectric to establish the electrostatic field for causing radial acceleration of other free electrons. The central portion of the beam which penetrates the dielectric experiences near zero electrostatic acceleration as there is no field in the central portion of the dielectric if both sides of the dielectric have a similar charge and volume distribution.

The device in accordance with FIG. 1 is capable of operating in either a continuous mode where the solenoid activated shutter 24 is maintained open for an extended period of time. Additionally, the device can be operated in a pulsed mode to provide high intensity bursts of laser radiation.

The first mode 'A' of operation is illustrated in FIG. 2, showing the operation of the vacuum gauge switch 26, the anode voltage applied to the electron guns 27 and 28, the currents for producing magnetic fields $\bar{B}$ and $\bar{B}_m$, as well as the shutter operation for providing pulses of laser energy. The operation of the device in accordance with FIG. 2 begins with the evacuation of chambers 12 and 21 by vacuum pumps attached at 18 and 22.

When the vacuum gauge switch 26 indicates achievement of the desired evacuation level of about $10^{-6}$ torr its switch closes. The switch closure activates both the application of gun accelerating potentials and disabling of the vacuum pumps until such time as it is necessary to reestablish the vacuum to the desired level. During this time period both sides of the dielectric 11 are equally and simultaneously charged to establish the strong electrostatic "wiggling" field 40 around the edges of dielectric 11. During this time period the magnetic fields $\bar{B}$ and $\bar{B}_m$ are off.

Within fractions of a millisecond after the creation of the "wiggling" electrostatic field the currents to superconducting magnetic elements 14 and 15 as well as 16 are turned on.

The powerful (about 6 Tesla) magnetic fields $\bar{B}_m$ establish magnetic mirrors in the chambers indicated in FIG. 1 by the closely spaced flux lines $\bar{B}_m$. The $\bar{B}$ field required is established by making the turns ratio of FIG. 1 element 16 to element 13 and/or 14 meet the requirements of the equation on page 4.

The magnetic mirror is now operative, and free electron lasing occurs as helical and longitudinally moving electrons pass through the high intensity electrostatic fields emanating from the edges of dielectric 11. The shutter 24 is operated at or subsequent to the application of the magnetic fields. Laser radiation which is stored within the optical cavity including elements 30 and 31 then exits through port 19 into the vacuum differential chamber 21. With the shutter 24 open, the high intensity radiation may be coupled from the device.

As an alternative, single, pulse mode operation is illustrated by FIG. 3. During the first depressurization interval for vacuum chambers 21 and 12, the anode voltage to each of the electron guns 27 and 28 is rapidly pulsed from 65 kv to 150 kv. The magnetic currents are likewise appropriately increased during the pulse sequence to a level which will establish the magnetic mirror effect. The shutter 22 is opened for the duration of the pulsed anode voltage interval, permitting pulses of laser energy to be coupled from the vacuum chamber 12. The foregoing device when operating in the pulsed mode produces the laser energy as needed, and the device is held in a non-operating state until such high energy laser pulses are to be produced.

The foregoing is illustrative only of techniques for generating a high intensity laser energy. Those skilled in the art will recognize yet other embodiments such as is shown in FIG. 4 in which the main chamber is permanently evacuated and laser energy extracted from the thinned portion of mirror 30 of the resonant cavity formed by mirrors 30, 31.

Figure 4:
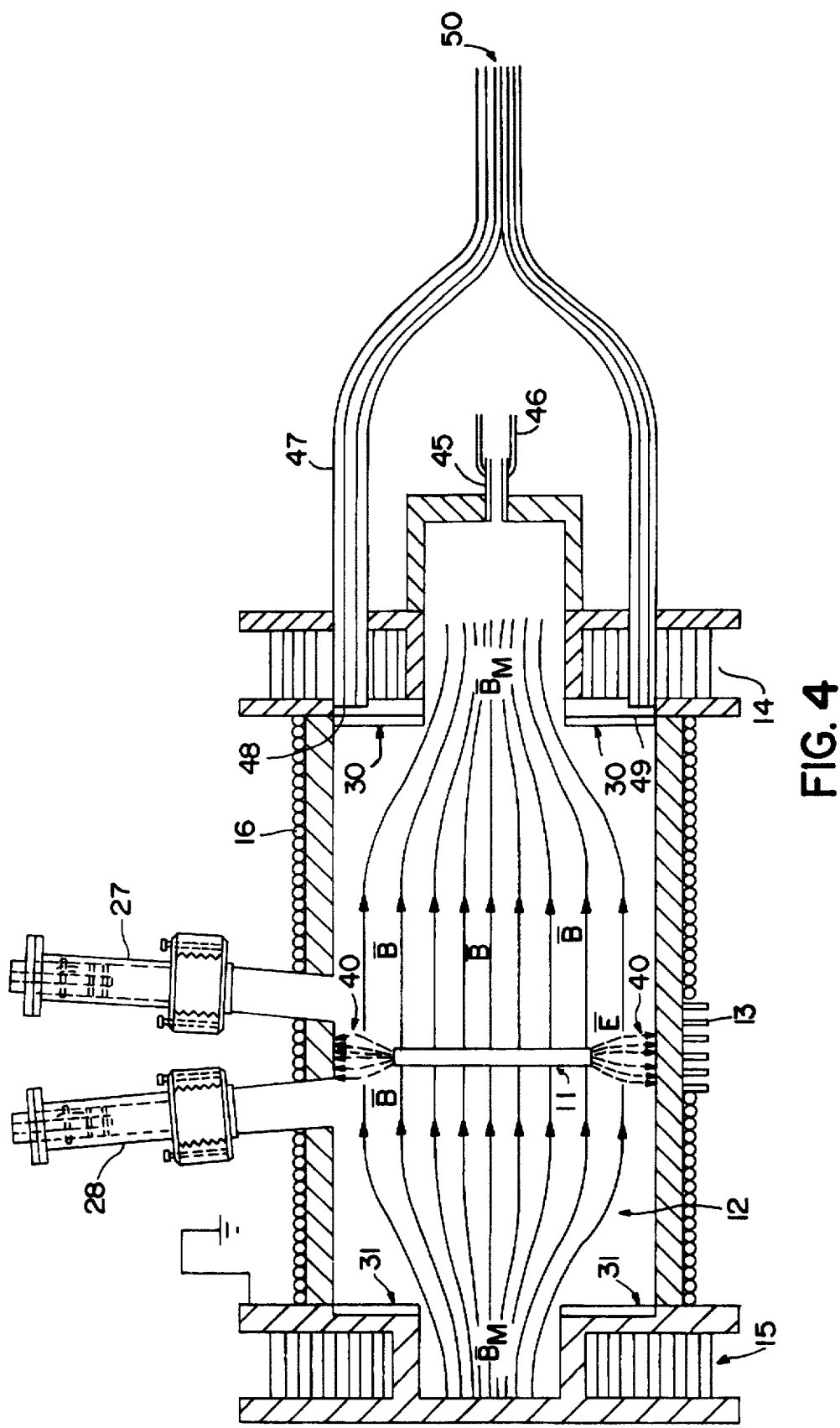
FIG. 4 is yet another embodiment of the invention which uses an optical waveguide to couple laser energy to the exterior of the chamber.

The embodiment of FIG. 4 includes a single opening 45 for drawing a vacuum within the chamber 12. Once the vacuum is drawn, a seal 46 is shown which may be a glass bead or other conventional sealing means for maintaining the vacuum within the chamber 12.

Laser energy is extracted through the bundle of optical waveguide 47, having a variable refractive index glass. The laser energy is coupled at an end 48 of the bundle 47, through a portion 49 of the reflective surface 30 which has a reduced thickness as well as an increased transmissivity with respect to the remaining portion of the reflector 30. By having a thin light transmissive portion at the opening 48 of the glass waveguide 47, the laser energy may be transmitted to the open end 50 of the optical waveguide.

The remaining portion of the embodiment of FIG. 4 includes elements which are identical with that of FIG. 1 and are marked with the same reference numeral.

What is claimed is:

1. An apparatus for producing high intensity of laser energy comprising:

a vacuum chamber supporting first and second magnetic mirrors which oscillate electrons between first and second ends of said vacuum chamber, and which supports a thin dielectric material charged on first and second sides thereof for producing a high intensity electric field which wiggles said electrons radially to produce laser radiation when said electrons pass through said electric field;

means for introducing a near relativistic electron beam into said vacuum chamber for supplying said electrons; and a vacuum chamber connected at said second end, having a sliding shutter operated by a vacuum gauge switch which opens to permit said laser radiation to escape.

2. The apparatus according to claim 1 further comprising means for controlling said shutter and to apply an operating current to said first and second magnetic mirrors at the same time said shutter is opened.

3. The apparatus according to claim 1 further comprising means for opening said shutter and enabling said means for introducing near relativistic beam into said vacuum chamber at substantially the same time.

4. The apparatus according to claim 1 further comprising an optical cavity in said vacuum chamber for collecting said laser radiation.

5. The apparatus according to claim 1 wherein said thin dielectric material is charged on opposite sides with the same polarity of charge for producing said electrostatic field.

6. An apparatus for generating high intensity laser radiation comprising:

a vacuum enclosure;

a pair of magnetic mirrors having first and second spaced apart magnetic elements within said vacuum enclosure for providing first and second high intensity magnetic fields around the circumference of said vacuum enclosure between each end of said vacuum enclosure, and a third magnetic element for providing a third magnetic field between said first and second magnetic elements having a predetermined intensity with respect to said high intensity magnetic fields which forces an electron to recirculate between said vacuum enclosure ends;

a dielectric material disposed within said vacuum enclosure, means for charging each side of said dielectric material with the same polarity to produce a high intensity electrostatic field along the edge of said dielectric material; and means for introducing electrons at near relativistic velocities into said magnetic fields to establish helical beams of electrons between said ends, which are subject to a wiggling acceleration in the area of said dielectric edge thus producing free electron lasing.

7. The apparatus of claim 6 further comprising an optical cavity for directing laser energy produced from said free electron lasing through an optical window in said vacuum enclosure.

8. The apparatus of claim 7 further comprising a shutter over said optical window which controls laser emissions from said vacuum enclosure.

9. The apparatus of claim 8 wherein said optical window comprises an opening at one end of said vacuum enclosure which communicates with a vacuum differential chamber, said chamber having an opening covered by said shutter.

10. The apparatus of claim 9 wherein said optical cavity is tunable by adjustment means which changes the position of an optical mirror of said optical cavity.

11. The apparatus of claim 6 wherein said means for introducing an electron beam includes first and second electron guns for directing an electron beam to each side of said dielectric material which charges said dielectric material and creates said electrons of near relativistic velocities which helically oscillate between said vacuum enclosure ends.

12. An apparatus for generating laser radiation comprising:

a pair of magnetic mirrors comprising spaced apart magnetic elements at first and second ends of a vacuum enclosure for providing first and second magnetic fields at each end of said enclosure, and a third magnetic element for providing a third axially directed magnetic field between said first and second magnetic fields, said magnetic fields having a relative magnetic intensity which forces an electron to be reflected between said first and second ends;

a dielectric material disposed within said vacuum enclosure having an edge adjacent a trajectory of said electron;

means for charging said dielectric material to produce a high intensity electrostatic field along the edges thereof which produces a wiggling acceleration of electrons which pass said edges;

means for introducing electrons into said magnetic fields for producing a helical oscillating electron beam which is reflected between said ends of said enclosure, and which is subject to a wiggling acceleration in the vicinity of said dielectric edge producing free electron lasing; and optical waveguide means coupled through an end of said enclosure to couple optical energy from said enclosure.

13. The apparatus according to claim 12 further comprising an optical cavity for collecting said laser radiation.

14. The apparatus according to claim 13 wherein said waveguide is optically coupled to one end of said optical cavity.

* * * * *